March 1, 1949.  F. RIEBER  2,463,312
FREQUENCY CONTROLLED AMMETER
Filed Jan. 29, 1944

INVENTOR.
FRANK RIEBER
BY Willis B Rice
ATTY.

Patented Mar. 1, 1949

2,463,312

UNITED STATES PATENT OFFICE 2,463,312

FREQUENCY CONTROLLED AMMETER

Frank Rieber, New York, N. Y., assignor to Interval Instruments, Inc., New York, N. Y., a corporation of New York Application January 29, 1944, Serial No. 520,206

5 Claims. (Cl. 171—95)

This invention relates to electrical measuring instruments, particularly to ammeters which may be made to read accurately in terms of current values, independent of whether the current be alternating or direct, and independent of frequency or wave form.

It has heretofore been proposed to use the expansion of a wire heated by an electrical current as a means for indicating the amount of current flowing through the wire, and such systems have in general relied upon the expansion in length of the wire due to the rise in temperature. Such systems have, however, had difficulties in the translation of the expansion into indications of current value, because the degree of expansion is relatively small and its multiplication by a lever mechanism to operate an indicating device has introduced errors. Moreover, since the wire itself is used to perform the work of moving the indicating means, it has necessarily been of appreciable dimensions, and on this account it has required a substantial current to produce an effective reading.

Such instruments have commonly been known as hot wire instruments, but they have possessed the limitation of acquiring a large power consumption within the instrument to produce effective readings.

There is, however, one special benefit derived from the hot wire type of instrument, and that is that the effective value of electric current is proportional to the integral of the mean square of its current values, and this property is particularly valuable where the current to be measured is of unusual wave form, or where it is desired to make comparison between currents of varying frequency or between alternating currents and direct currents upon the same meter.

It is an object of this invention to provide a system in which advantages of the hot wire type of instrument are retained while overcoming difficulties. In a copending application for transducers filed of even date herewith and bearing Serial No. 520,196, I have disclosed an apparatus in which the frequency of a vibrating wire is used as a measure of the strain imposed upon the wire so that the strain can be directly interpreted in terms of the frequency to which the wire responds. In another copending application for oscillating systems filed of even date herewith and bearing Serial No. 520,197, now abandoned, I have disclosed means for utilizing such an instrument in the control of an oscillator, so that the oscillator is caused to vibrate at a frequency determined by the natural period of vibration of the wire under the condition of tension to which it is subjected, and the oscillator in turn supplies the current which maintains the wire in vibration.

In this invention I have utilized these principles in the measurement of electrical currents on the hot wire principle.

The invention accordingly comprises a device possessing the features, properties and the relation of elements which will be exemplified in the article hereinafter described and the scope of the application of which will be indicated in the claims.

For a fuller understanding of the nature and objects of the invention, reference should be had to the following detailed description, taken in connection with the accompanying drawings, in which.

Figure 1:
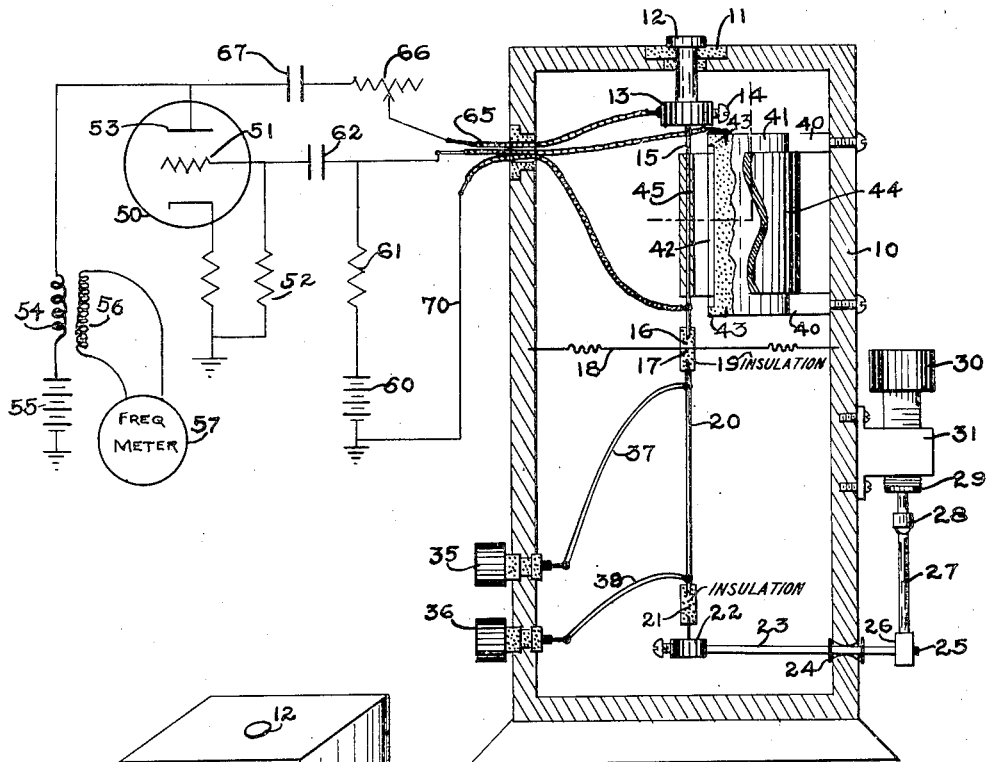
Fig. 1 is a vertical section through an apparatus embodying this invention, connected up to a suitable circuit shown in diagram.
Figure 2:
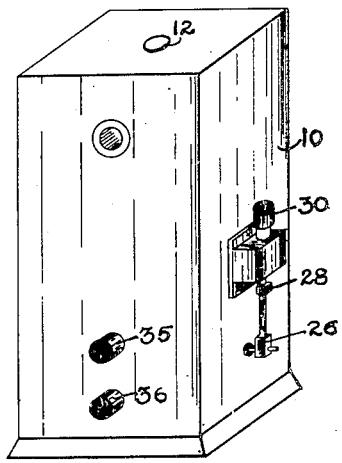
Fig. 2 is a perspective view of the exterior of the case, as shown in Fig. 1.
Figure 3:
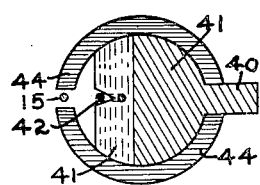
Fig. 3 is a section on the line 3—3 of Fig. 1.

In the drawings the numeral 10 designates a shell which, although shown in one piece, will of course be divided into any convenient manner to provide mechanical access to its interior. In the center of the top of the shell is provided an insulating member 11 which in turn carries a centrally disposed stud 12 having, inside the shell, head 13, to which is attached by a set screw 14 a wire 15 which serves as a vibrating member. The lower end of this wire 15 is attached to an insulator 16, which is fastened to the center 17 of a flexible diaphragm 18, which extends across the interior of the shell 10. The insulating member 16 extends through the diaphragm, as shown at 19, and to the portion 19 there is attached the upper end of a wire 20, the lower end of which is carried by an insulator 21 which is attached to a block 22 on a lever 23 pivoted at 24 and having its outer end 25 extending through a block 26. This block is carried by a rod 27 attached as by a ball and socket joint 28 to a screw 29 operated by a narrow head 30 and screwing into a stud 31 attached to the side of the shell.

The adjustments are such that when the diaphragm 18 is free from tension, the wire 15, and correspondingly the wire 20, will be under a certain predetermined tension. The wire 20 is chosen to have a high uniform linear thermal expansion.

Binding posts 35 and 36 are connected by leads 37 and 38 to the top and bottom of the wire 20, so that the current to be measured, or some predetermined fraction thereof, may be passed through the wire 20.

It will be clear that the expansion of the wire 20 under heat will relieve the tension upon the wire 15, and thereby change its periodicity, but at the same time the actual degree of movement of the point of juncture of the two wires need be only that amount which the wire 15 will stretch, due to the difference in tension. The diaphragm 18 is solely for the purpose of positioning the wire 15 laterally. It is thin and sensitive, but due to the very small movement required of it, it does not affect the readings.

Due to the fact that the change in length required of the wire 20 to cause the indications of current is so very slight, very small changes in temperature, and hence very small changes in current, will cause a sufficient variation in the frequency of the wire 15 to be readily indicated. Moreover, by reason of the fact that the wire 20 performs no mechanical function except to transmit the strain between the lever 23 and the wire 15, the wire 20 may be made very small in diameter, and this again correspondingly requires the need for small current to effect readable changes in its expansion.

Means are provided corresponding to the disclosure of the copending application for oscillating systems above referred to, for maintaining the wire in oscillation at its resonant frequency and for utilizing that vibration to determine the frequency of an oscillating system which itself is used to maintain the wire in oscillation. As shown, there is mounted upon the inner wall of shell 10 a pair of brackets 40, one above the other, which support a vertical insulating member 41 which carries a linear electrode 42 parallel to and closely adjacent to the wire 15. This electrode is conveniently made in the form of a wire stretched between projections 43 on the top and bottom of the insulating member. A C-shaped permanent magnet 44 has its poles 45 spaced on opposite sides of the wire 15, so that any current imposed upon the wire 15 will exert a tendency to move that wire toward or from the electrode 42.

The oscillating system used for maintaining the wire in vibration is diagrammatically represented by a vacuum tube 50, having the potential of its grid 51 maintained by a resistance 52, and having its plate 53 fed with current through a translating device 54 by a battery 55. The electrode 42 has a positive potential imposed upon it by a battery 60 through a resistance 61, and it is connected to the grid 51 through a condenser 62. The wire 15 has its upper end connected by a conductor 65 through a feed back control resistance 66 and a condenser 67 to the plate 53, and has its lower end connected to ground through a conductor 70. The indications of the instrument are given by a frequency meter 57 connected to the secondary 56 of the translating device 54, calibrated to read directly in amperes or other quantities measured.

With the foregoing construction it will be clear that when alternating current is imposed upon the wire 15, it will have no substantial effect upon that wire unless and until it is of the frequency to which the wire is mechanically resonant. At that frequency, however, it will set the wire in motion, and this motion will cause the wire, as it moves toward and recedes from the electrode 42, to effect the grid 51 to determine the frequency of oscillation of the oscillator, which oscillator in turn feeds back a current through the wire 15 to maintain that oscillation. Thus it will be clear that the oscillator will function at all times at a frequency which is precisely determined by the mechanical resonant frequency of the wire.

It will also be clear that the resonant frequency of the wire will vary very sharply with changes in tension in the wire, and consequently will vary very sharply with any expansion in the wire 20 which relieves that tension.

With this construction it is possible therefore to measure changes in current value which are very small, and thus the instrument has a sensitivity which has heretofore been impossible in instruments working upon the hot wire principle.

It will also be evident that the instrument may be made to function as an ammeter for heavy currents by the application of a fixed shunt across the terminals 35 and 36, according to well known principles. Moreover, the instrument is sufficiently sensitive so that it may be utilized as a volt meter by using it in series with a series resistance of fixed value.

The instrument possesses the distinct advantage that because of the small amount of power applied to the hot wire, there is no appreciable heating within the instrument and no changes from this cause therefore occur in the calibration of the instrument during use.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A device of the character described comprising, in combination, a vibratable wire and a wire having a linear thermal expansion, mechanically connected together in alignment, means for maintaining said wires under common tension, means for passing a current to be measured through said thermally expansive wire, means for maintaining said vibratable wire in oscillation at its natural period of frequency, and means for measuring the frequency of oscillation.

2. A device in accordance with the preceding claim, including means connected to the point of juncture between said wires for preventing vibration at that point, said means being constructed and arranged to permit all changes in length of the thermally responsive wire to be transmitted immediately as changes in tension in said first mentioned wire.

3. A device of the character described comprising, in combination, a vibratable wire, a wire having a linear thermal expansion connected to said vibratable wire in alignment therewith to cause variations in the length of said expansible wire to vary the tension on said vibratable wire, terminals at the ends of each of said wires whereby current may be passed through them, means for holding the end of said vibratable wire adjacent to said thermally expansive wire from vibration, and means for establishing a magnetic field in which said vibratable wire is immersed, means for maintaining said vibratable wire in vibration and means for indicating its rate of vibration.

4. A device of the character described comprising, in combination, a vibratable wire, a wire having a linear thermal expansion connected to said vibratable wire in alignment therewith to cause variations in the length of said expansible wire to vary the tension on said vibratable wire, terminals at the ends of each of said wires whereby current may be passed through them, means for holding the end of said vibratable wire adjacent to said thermally expansive wire from vibration and means for establishing a magnetic field in which said vibratable wire is immersed, an oscillator having a pulsating circuit connected to the terminals of said vibratable wire, means responsive to the vibrations of said wire as a whole for determining the frequency of said oscillator from the frequency of said wire, and means for measuring the frequency of the oscillator.

5. A device of the character described comprising, in combination, a vibratable wire, a wire having a linear thermal expansion in alignment with and connected to said vibratable wire to cause variations in the length of said expansible wire to vary the tension on said vibrating wire, terminals at the ends of each of said wires whereby current may be passed through them, means for holding the end of said vibratable wire adjacent to said thermally expansive wire from vibration, and means for establishing a magnetic field in which said vibratable wire is immersed, an oscillator having a pulsating circuit connected to the terminals of said vibratable wire, an electrode of substantially the same length as the vibrating portion of the wire connected to said oscillator to determine the frequency of said oscillator from the frequency of said wire, and means for measuring the frequency of said oscillator.

FRANK RIEBER.

REFERENCES CITED

The following references are of record in the file of this patent:

UNITED STATES PATENTS

| Number | Name | Date |
|---|---|---|
| 439,381 | Bristol | Oct. 28, 1890 |
| 952,778 | Hertzberg et al. | Mar. 22, 1910 |
| 1,995,305 | Hayes | Mar. 26, 1935 |
| 2,050,674 | Stover | Aug. 11, 1936 |
| 2,265,011 | Siegel | Dec. 2, 1941 |
| 2,306,137 | Pabst et al. | Dec. 22, 1942 |

FOREIGN PATENTS

| Number | Country | Date |
|---|---|---|
| 191,265 | Germany | Nov. 5, 1907 |
| 320,655 | Germany | Nov. 30, 1915 |
| 622,581 | Germany | July 7, 1932 |